Sept. 13, 1966    R. HAYDEN    3,273,093
AUTOMOBILE LAMP RELAY AND SYSTEM
Filed Sept. 24, 1965
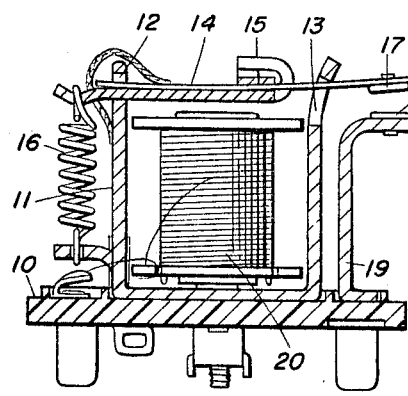
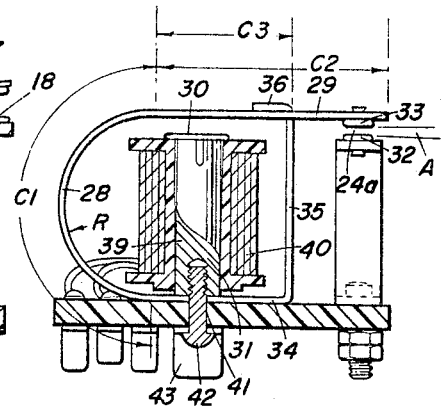
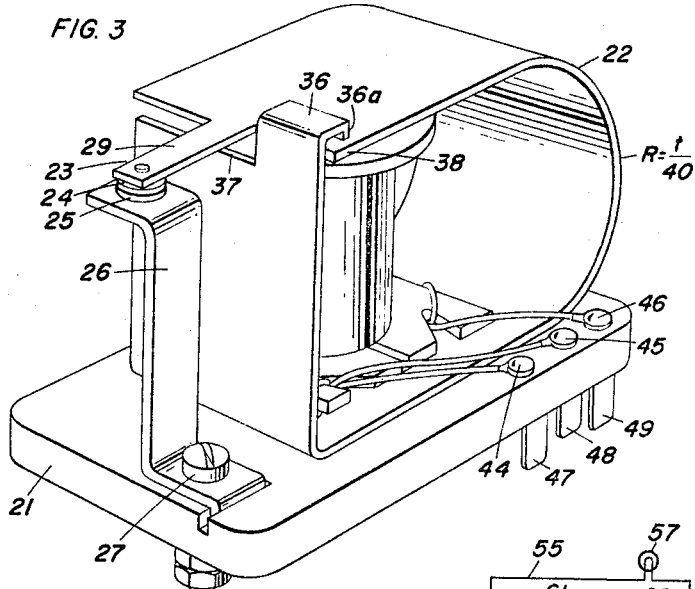
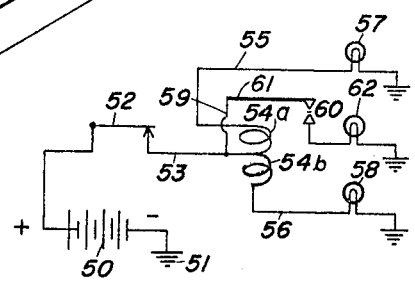
INVENTOR:
RODNEY HAYDEN
BY: Philip E. Parker
ATT'Y.

United States Patent Office 3,273,093
Patented Sept. 13, 1966

3,273,093
AUTOMOBILE LAMP RELAY AND SYSTEM
Rodney Hayden, Stoney Creek, Ontario, Canada, assignor to United-Carr Incorporated, Boston, Mass., a corporation of Delaware
Filed Sept. 24, 1965, Ser. No. 490,008
Claims priority, application Canada, Sept. 20, 1965, 940,927
7 Claims. (Cl. 335—203)

This invention relates to an automobile lamp relay and to a system utilizing same.

There is a need in lamp systems for a device to indicate when any lamp in the light system of the automobile has failed. The types of lamps which require a signal indication of this kind are those which are not readily viewable by the operator when driving. Thus headlamps, tail lamps, braking lamps and running lamps which may be critical to safe operation may fail without the operator being aware of such failure.

The invention contemplates the provision of a lamp-out indicator in the form of an inexpensive but particularly reliable relay device of low resistance in the lamp circuits of the automobile and in series with the lamps to provide a warning light viewable from the driver's seat of the automobile in the event a lamp should fail.

Prior art relay structures have not been found to be suitable for such an application because of the undue expense thereof due to the complication of numerous moving parts including pivots and moving connections adapted to be slow acting or to be rendered substantially immovable due to accumulation of dirt, corrosion, frost or other fouling. Further conventional relay structures are ordinarily provided of coil form which is placed in series in an electric lamp circuit would impair the voltage and hence the illumination available. All relays of the prior art are characterized by operating members which in their mechanical design and structure involve sliding surfaces around pivot pins, over pivot areas, or pivot connecting springs, all of which involve friction and wherein the relatively sliding or moving surfaces are adapted to be fouled.

Accordingly it is a main object of the present invention to provide a relay structure which is frictionless and which is devoid of mutually sliding surfaces.

It is a further object of the invention to provide a relay structure and system adapted for a lamp-out indicator circuit in automobiles which is particularly inexpensive to fabricate, simple of design and embodying no more than one part capable of motion such motion being accomplished without surface sliding friction.

It is a further object of the invention to provide a lamp-out indicator system for automobile use in which the lamp circuits are disposed electrically in series with low resistance relay coils connected in opposed magnetic circuit to provide a neutral total magnetic field during operation of the lamps of the circuit to which the relay is connected and adapted upon failure of one of said lamps to effect cessation of current flow through the coil of the relay for said lamp resulting in an inbalance of the magnetic circuit and actuation of the relay to effect lighting of the indicator lamp.

Other objects of the invention will be appreciated by a study of the following specification taken in conjunction with the accompanying drawings.

In the drawings:

FIGURE 1 is a sectional elevation of a prior art relay which the relay of the invention is intended to replace insofar as a relay structure is concerned.

FIGURE 2 is a lamp circuit of the invention embodying a relay adapted to be actuated in the event of an inbalance in said electrical circuit.

FIGURE 3 is a perspective view of the improved relay of the invention.

FIGURE 4 is a sectional elevation of the relay of FIGURE 3 illustrated for comparison with the corresponding sectional elevation of the prior art relay of FIGURE 1.

The class of relay of interest to this invention is that adapted to be produced in very large production volume, that is of the order of millions of units. Obviously when considering such volume of production, cost is critical to the utility of the device at all and yet the device must be not only workable but dependably so. Accordingly mere elimination or substitution of parts is not sufficient but rather that concept achieving the workable result.

Thus a prior art relay of the class considered herein may comprise a collection of formerly regarded critical components essential to ensure reliability as well as sufficient cost savings. The prior art relay of FIGURE 1 comprises a base 10 to which is fixed a U-shaped supporting frame 11 having a fulcrum aperture 12 and an armature aperture 13 through which a flexible armature 14 extends from a rigid pivot clamp 15 tensioned by spring 16. The purpose of spring 16 is to return the armature 14 to its normal upward position separating contacts 17 and 18 the latter being on contact support 19 rising from base 10. The coil 20 is rigidly supported within frame 11. The manufacturing operations to produce this structure are numerous and the tooling somewhat extensive as contrasted with the device of the invention hereinafter described.

In FIGURES 3 and 4 the relay structure of the invention comprises a base 21 upon which is mounted a self-retaining obturator structure 22 having a projecting switch arm portion 23 carrying contact 24 adapted to articulate with contact 25 the latter rising from connection to support arm 26 fixed to base 21 by terminal screw 27.

The obturator 22 is formed of a strip of low carbon steel especially 1012 deep draw steel rolled to width, thickness and 98 to 100 Rockwell hardness. Such B scale material will retain its spring characteristics within the limits of flexing operation required for an apparently indefinite period, tests thereon having exceeded a million cycles without evidence of change in metal structure or surface characteristics or springiness. Because the material is low in carbon content it provides a good magnectically responsive material. The material can be worked or formed either on a press or on rollers. Generally a low carbon low alloy steel of substantially optimum cold working may be regarded as a satisfactory material. The introduction of carbon increases the springiness and a reduction in carbon enhances the magnetic properties.

The reliability of the obturator in its springiness depends upon a geometry which limits the functioning thereof during spring action to a modest stressing of the material well within the elastic limit and of the order for example of $\frac{1}{100}$ or less of the elastic limit of the material thereof. This contrasts markedly with the stressing of prior art spring 16 to the order of 10% to 20% of the elastic limit. The geometry preferred according to the invention is such that the radius R of the curve portion 28 be of the order of about forty times the thickness $t$ through substantially 180° whereby the length of such arc $$C_1 = 40 \cdot \pi \cdot t \text{ (approximately)}$$

Further the cantilever portion or arm 29 forming an integral extension of the spring arm 28 is of a length $C_2$ substantially equal to $C_1$. The arm 27 being of the same material as the spring portion 28 should not be so long that its springiness detracts from the rigidity necessary for it to act as a switching arm but only so long as to develop a sufficient and practical gap between the switch contacts 24 and 25 in conjunction with providing a practical magnetic gap 30 with the core member 31. On the other hand if the arm 29 is too short there will be insufficient spring action for contacts 24, 25. In general therefore the proportions described provide a suitable structure of high reliability and workability in such manner that the angle of flexure A for the arm portion 29 between closed and open positions represented by lines 32, 33 is small. Furthermore it is to be noted that the magnetic gap 30 is larger than the contact gap 24a whereby the arm 29 is tensioned by the magnetic flux during closure of contacts 24, 25 effecting a quick release of the contacts upon severance of the magnetic field under the effect of the tensions in the arm portions 29 providing motion of the obturator member as a whole to overcome the kinetic energy thereof and to enable the inherent tensions in the spring arm 28 to effect quick separation of the contacts 24, 25. Large flexures are therefore avoided and yet the simplicity of the structure is preserved. Accordingly the base portion of the obturator may be defined by a continuation of the material thereof to define the mounting base portion 34 thereof terminating in the upwardly extending bracket arm 35 having an inturned overlying retaining flange 36 cut away as at 37 to accommodate the passage of arm 29 thereby and permitting flange 36 to overlay one corner portion 38 of flexing arm 29. While two flanges 36 may be provided spaced on either side of arm 29 it is to be understood that this has generally been found to be undesirable because while some twist is imparted to the structure in the open position the structure is self-aligning under influence of the magnetic field from core structure 31 upon closure of the contacts 24 and 25. Furthermore the small remnant magnetism which may reside in flange 36 can attract the free corner portion 38 tending to stick to the obturator in the open position. To overcome any prospect of this occurrence it is preferred to utilize one flange only of a relatively small size and characterized by a downwardly turned lip portion 36a having a small area of contact with the surfaces of the free corner portion 38.

Magnetic gap 30 is defined by core 39 of electro-magnetic coil 40, said core being fastened through a hole 41 in base portion 34 by a suitable screw 42 extending through the insulate base 10 and effecting an electrical contacting means through the terminal 43 to the contact 33. Coil 40 in a preferred application embodies a centre tapped winding having three leads 44, 45, 46 electrically connected to terminals 47, 48, 49 respectively on insulate base 10.

A typical circuit for application of the relay of the invention and especially the centre tap coil style thereof is illustrated in FIGURE 2 wherein battery 50 is grounded at 51 to the centre tap of series wound relay coils 54a, 54b. In the structure shown in FIGURES 3 and 4 this would comprise a connection of terminals 43 and 48 together to a control switch such as the control switch 52. The other two leads of the coil 55 and 56 control lamps 57 and 58 respectively. The opposed current circuit by line 59 communicates through the normally open relay contacts 60 corresponding to contacts 32, 33 of FIGURE 4. It will be evident that in assuming lamps 57 and 58 of FIGURE 2 to be energized the contact 60 will be open since opposed coils 54a, 54b provide a resulting zero magnetic field or attraction for relay arm 61. Thus upon failure of either of lamps 57 or 58 the unopposed magnetic flux in the remaining current conducting relay coil of the remaining energized lamps in series therewith will attract relay armature 61 closing contacts 60 to energize warning or signal lamps 62.

The relay structure of the invention is of especially simple design embodying essentially one moving part only in the form of a metal obturator formed of a continuous length of spring strip low carbon ferrous material of high hardness. The obturator is so formed as to provide a free arcuate portion extending through substantially 180° of arc between a free arm portion extending tangentially therefrom and a base portion forming a part thereof, the latter terminating in a bracket arm extending at right-angles toward said arm portion and engageable with the latter to retain the same against its spring tension by a flange part. The obturator is mounted on an insulate base by suitable connecting means which serve to mount the electro-magnetic coil within the obturator structure to provide a predetermined spacing between the free arm portion adjacent the core of the electro-magnetic coil. An electrical contact is provided in the free end of the free arm portion, and a second electrical contact, including support means therefor, rises from the insulate base in normal open spaced relation to the first contact to define a contact gap less than said predetermined spacing. In this way the inherent springiness of the free arm portion of the obturator is utilized to provide a quick release of the contacts necessary to a clean switching function. It will be apparent that the relay structure of the invention is frictionless since there are no relatively moving surfaces or pivots.

It is intended that the present disclosure should not be construed in any limiting sense other than that indicated by the scope of the following claims having regard to the state of the prior art.

What I claim is:
1. A direct current electrical relay for automobile lamp circuits and the like and comprising: a spring metal obturator formed of a continuous length of spring strip low carbon ferrous material of high hardness having a free arcuate portion extending through substantially 180° of arc between a free arm portion extending tangentially therefrom and forming a part thereof and a base portion forming a part thereof and terminating in a bracket arm extending to said arm portion and providing a flange part adapted to restrain said arm from outward springing under the inherent spring tension of said strip material; an insulate base; an electro-magnetic coil; means mounting said base portion on said insulate base with said coil in assembly therewith within the bracket arm arcuate portion, arm, and base portion of said obturator and spacing said coil a predetermined distance from said free arm portion; an electrical contact on the free end of said arm portion; and a second electrical contact including support means therefor rising from said insulate base in normal open spaced relation thereto defining a normally open contact gap less than said predetermined spacing.

2. A relay as claimed in claim 1 in which the radius of the arc of the arcuate portion is of the order of about forty times the thickness of the strip material thereof.

3. A relay as claimed in claim 1 in which the relay coil comprises equal series windings.

4. A relay as claimed in claim 1 in which the relay coil comprises equal series windings; and means connecting one end of both said windings for opposed magnetic relation to said obturator strip.

5. A relay as claimed in claim 1 in which said flange embodies an inturned lip providing a small area of engagement with said arm portion.

6. A relay as claimed in claim 1 in which the radius of the arc of the arcuate portion is of the order of about forty times the thickness of the strip material thereof; and wherein said flange part embodies an inturned retaining lip of small surface area.

7. A relay as claimed in claim 1 in which the relay coil comprises equal series windings; means connecting one end of each said windings for opposed magnetic relation to said obturator strip; and means for connecting a warning lamp circuit to the support means for said second electrical contact rendering energizing thereof responsive to de-energizing of one of said series windings.

No references cited.

BERNARD A. GILHEANY, *Primary Examiner*

J. J. BAKER, *Examiner.*